(12) United States Patent
Sasak et al.

(10) Patent No.: US 9,794,182 B2
(45) Date of Patent: *Oct. 17, 2017

(54) METHODS AND APPARATUS FOR PROVIDING TIMING ANALYSIS FOR PACKET STREAMS OVER PACKET CARRIERS

(71) Applicant: Tellabs Operations Inc., Naperville, IL (US)

(72) Inventors: Anthony Leonard Sasak, Arlington Heights, IL (US); Christopher V. O'Brien, North Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/006,955

(22) Filed: Jan. 26, 2016

(65) Prior Publication Data
US 2016/0142329 A1 May 19, 2016

Related U.S. Application Data

(63) Continuation of application No. 13/861,187, filed on Apr. 11, 2013, now Pat. No. 9,270,396.

(51) Int. Cl.
*H04J 3/06* (2006.01)
*H04L 12/841* (2013.01)
(Continued)

(52) U.S. Cl.
CPC ............ *H04L 47/283* (2013.01); *H04J 3/065* (2013.01); *H04J 3/14* (2013.01); *H04L 47/621* (2013.01); *H04L 47/6245* (2013.01); *H04J 3/0632* (2013.01); *H04L 41/064* (2013.01); *H04L 43/106* (2013.01)

(58) Field of Classification Search
CPC ......... H04L 49/30; H04L 30/18; H04L 49/90; H04L 49/3027
See application file for complete search history.

(56) References Cited

U.S. PATENT DOCUMENTS 6,075,812 A * 6/2000 Cafarella ............... H04B 1/707
375/141
6,246,684 B1 * 6/2001 Chapman ................ H04L 29/06
370/363
(Continued)

*Primary Examiner* — Andrew Lai
*Assistant Examiner* — Zhiren Qin
(74) *Attorney, Agent, or Firm* — James M. Wu; JW Law Group

(57) ABSTRACT

A network device such as a router or switch, in one embodiment, includes a timing analyzer which is capable of providing timing analysis over one or more network circuits. The timing analyzer, in one aspect, receives a data packet traveling across a circuit emulation service ("CES") circuit such as T1 or E1 circuit. Upon obtaining an arrival timestamp associated with the data packet, the arrival timestamp is stored in a timestamp buffer in accordance with a first-in first-out ("FIFO") storage sequence. After identifying the oldest arrival timestamp in the timestamp buffer, an offset is generated based on the result of comparison between the arrival timestamp and the oldest timestamp. The timing analyzer can also be configured to generate timing reports on-demand based on generated offset(s).

14 Claims, 6 Drawing Sheets

(51) Int. Cl.
*H04J 3/14* (2006.01)
*H04L 12/863* (2013.01)
*H04L 12/26* (2006.01)
*H04L 12/24* (2006.01)

(56) References Cited

U.S. PATENT DOCUMENTS

| | | | | |
|---|---|---|---|---|
| 2007/0019547 A1* | 1/2007 | Ho | ............. | H04L 12/6418 370/230 |
| 2008/0001742 A1* | 1/2008 | Bauchot | ............. | G01G 19/4144 340/568.5 |
| 2012/0221881 A1* | 8/2012 | Webb, III | ............. | H04L 43/0852 713/400 |

* cited by examiner

METHODS AND APPARATUS FOR PROVIDING TIMING ANALYSIS FOR PACKET STREAMS OVER PACKET CARRIERS

PRIORITY

This patent application is a continuation of U.S. patent application of U.S. patent application Ser. No. 13/861,187, filed on Apr. 11, 2013 in the name of the same inventor and entitled "Methods and Apparatus for Providing Timing Analysis for Packet Streams Over Packet Carriers," hereby incorporated into the present application by reference.

FIELD

The exemplary embodiment(s) of the present invention relates to communications network. More specifically, the exemplary embodiment(s) of the present invention relates to timing analysis relating to packet streams.

BACKGROUND

A network environment typically includes various network devices, such as routers, line modules, hubs, and/or switches, for delivery of digital information via conventional network transporting formats such as packets and frames. Packets, packet frames, data streams, and/or data traffics typically travel from source devices to destination devices via one or more packet switched networks ("PSNs") or networks. Information pertaining to the transfer of data packet(s) and/or frame(s) through the network(s) is usually embedded within the packet and/or frame itself. Each packet, for instance, traveling through multiple nodes via one or more communications networks such as Internet and/or Ethernet, can typically be handled independently from other packets in a packet stream or traffic. Each node which may include routing, switching, and/or bridging engines processes incoming packets or frames, and determines where the packet(s) or frame(s) should be forwarded.

To deliver high performance, it is critical for a network or PSN to maintain high speed data traffic flowing through circuit emulation service ("CES") circuits with minimal packet loss and/or drop. CES, for example, allows packet transport via synchronous circuits such as T1/E1 over asynchronous networks. Note that T1 is a digital carrier signal that transmits digital signal with a data rate of about 1.544 megabits per second. T1, for example, contains twenty four digital channels and requires a network device having digital connection(s). E1, which is similar to T1, is used for digital transmission with a data rate of about 2.048 megabits per second. Unlike T1, E1 has 32 channels at the speed of 64 Kbps per channel.

A CES carrier typically does not know the content of data stream that the carrier transports, as well as timing characteristics associated with the data stream. However, when a timing problem occurs at the endpoint of a CES, it is usually difficult to debug because without invasive debugging techniques, it is often hard to ascertain the root of the problem. Such invasive procedure(s) can render outage(s) of network service to all connected customers, invasive procedure(s) typically is the last option to debug the problems. For example, when a legacy time-division multiplexing ("TDM") circuit is replaced with a SAToP (Structure-Agnostic TDM over Packet) or CESoPSN (circuit emulation service over PSN) link(s), TDM data streams generated at one endpoint of SAToP can fail due to unpredictable reasons, such as incorrect device configuration, network congestion, circuit overloading, and the like. Note that incorrect or inaccurate timing configuration at one endpoint circuit could cause the other far-end circuit to fail.

SUMMARY

One embodiment of the present invention discloses a timing analyzer in a network device able to provide timing analysis over one or more network circuits. The timing analyzer, in one aspect, receives a data packet traveling across a circuit emulation service ("CES") circuit such as T1 or E1 circuit. Upon obtaining an arrival timestamp associated with the data packet, the arrival timestamp is stored in a timestamp buffer in accordance with a first-in first-out ("FIFO") storage sequence. After identifying the oldest arrival timestamp in the timestamp buffer, an offset is generated based on the result of comparison between the arrival timestamp and the oldest timestamp. The timing analyzer can also be configured to generate timing reports on-demand based on generated offset(s).

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
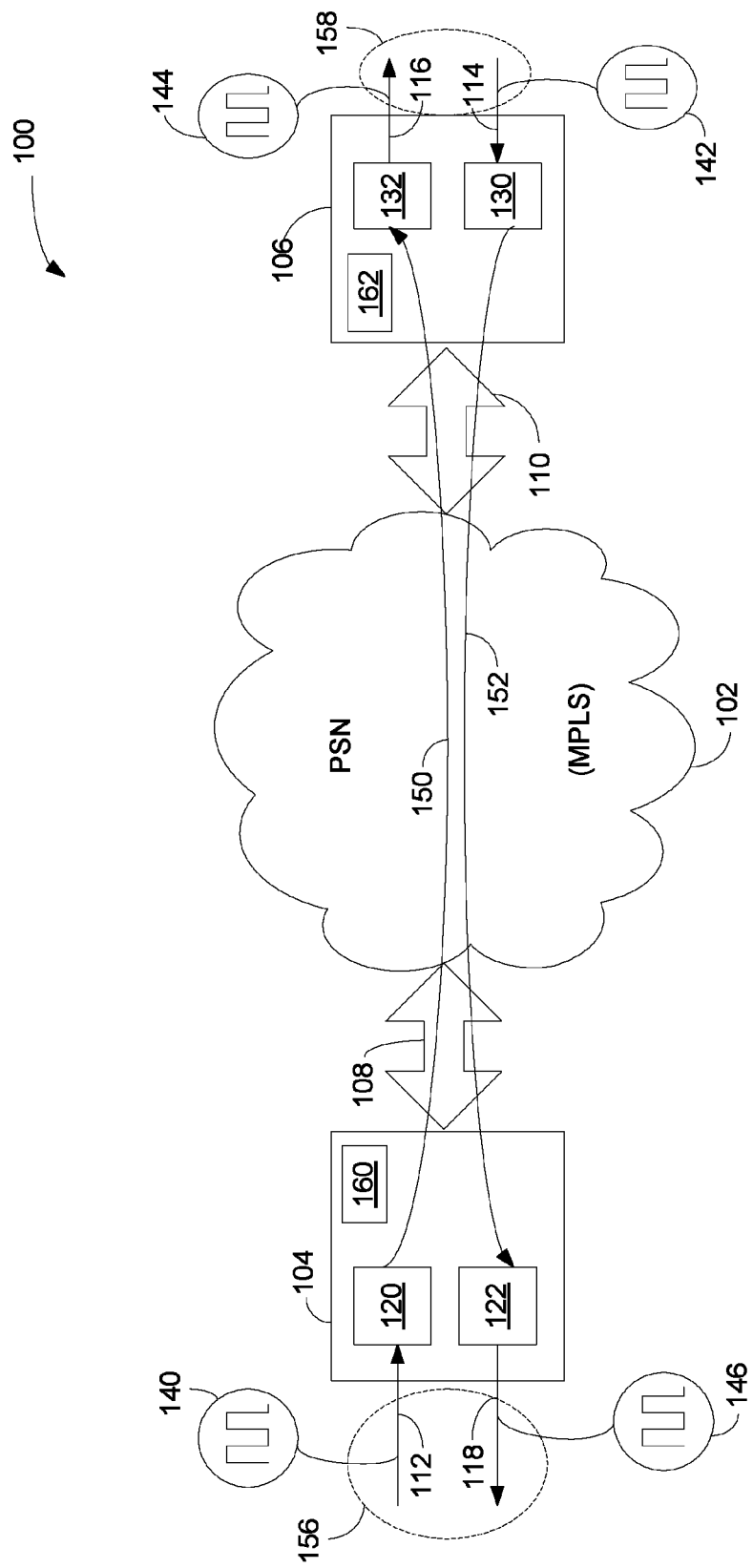
FIG. 1 is a block diagram illustrating a network configuration using a timing analyzer configured to improve network performance in accordance with one embodiment of the present invention.

Exemplary embodiment(s) of the present invention is described herein in the context of a method, device, and apparatus for enhancing overall network performance by providing timing analysis to packets traveling through T1 or E1 carriers.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Embodiment(s) of the present invention discloses a timing analyzer capable of providing timing analysis over one or more network circuits. The timing analyzer, in one aspect, is configured to receive a data packet traveling across a circuit emulation service ("CES") circuit such as T1 or E1 circuit. After generating an arrival timestamp associated with the data packet, the arrival timestamp is stored in a timestamp buffer based on a first-in first-out ("FIFO") storage sequence. For example, the timestamp buffer can be a FIFO shift register. After retrieving the oldest arrival timestamp within the timestamp buffer, an offset is generated or calculated by comparing between the arrival timestamp and the oldest timestamp. A timing report, which can be demanded in real time, can be generated based on the offset. In one aspect, an alarm is raised if the offset falls outside of a predefined range of limits.

FIG. 1 is a block diagram 100 illustrating a network configuration using a timing analyzer configured to improve network performance in accordance with one embodiment of the present invention. Diagram 100, in one embodiment, includes a PSN, MPLS network 102 (or cloud), two nodes 104-106, and two regional networks 156-158. Interfaces 108-110 can be Ethernet interfaces that are used to bridge and/or transfer data packets and/or frames between nodes 104 and 106 via PSN 102. It should be noted that the underlying concept of the exemplary embodiment(s) of the present invention would not change if one or more blocks (or elements or connections) were added to or removed from diagram 100.

PSN or MPLS 102, which may be situated between Data Link Layer and Network Layer, is a global based communications network capable of providing data transfer between circuit-based systems (or clients) and packet-based systems (or clients). PSN or MPLS 102, hereinafter referred to as PSN 102, is able to handle various types of data format, such as IP, ATM, SDH, SONET, TDM, and/or Ethernet data streams. Note that the concept of embodiment(s) of the network configuration would not alter if PSN 102 is replaced with another types of global communications network(s), such as Wide Area Network(s) ("WAN"), Internet, Metro Ethernet Network ("MEN"), Metropolitan Area Network ("MAN"), and the like.

A CES circuit network is a regional and/or private network system since CES links are used to dedicate CES services to a group of known customers. CES networks 156-158, for example, are circuit-based switching networks, usually based on SONET/PDH/SDH technologies. Frame-based CES networking technologies are also capable of transmitting multiple signals simultaneously over a single transmission path using, for instance, an interleaving time-slot mechanism. The interleaving timing-slot mechanism, for example, packs multiple data streams with each stream having a speed of 64 kilobits per second ("Kbps") per channel such as a T1 channel. Note that T1 has a capacity of 1.544 Mbps and E1 has a capacity of 2.048 Mbps. It should be note that CES networks 156-158 may include other networks, such as MEN, MAN, WAN, and/or a combination of MEN, MAN, LAN, and/or WAN.

To transport CES data packets/frames through a PSN such as Internet, CES provides TDM services to customers (or providers) by emulating TDM circuits over a PSN. TDM services include Plesiochronous Digital Hierarchy ("PDH"), Synchronous Optical Network ("SONET"), and/or Synchronous Digital Hierarchy ("SDH") services. PDH includes T1 and E1 lines while SONET/SDH includes STS-1, STS-3, et cetera.

A CES circuit, for example, is a point-to-point link and facilitates a data flow between a circuit-switching network and a packet-switching network. To transfer multiple bit streams simultaneously over multiple sub-channels, a time domain, for example, is divided into multiple time slots wherein each time slot is designated to transport one bit stream. With implementation of Ethernet CES, CES technologies are migrating to the world of packet network(s).

Referring back to FIG. 1, node 104 is a network device capable of receiving data from a circuit 152 (or CES) and routing data onto a circuit 150. Node 104, which can be a router, a switch, a bridge, or a combination of router, switch, and/or bridge, includes a timing analyzer 160, an egress element 122 and an ingress element 120 wherein elements 120-122 are coupled to network 156 and PSN 102. Ingress element 120 is capable of receiving CES data stream or frames with a reference clock 140 over connection 112. Reference clock 140 provides a clock frequency used to clock data onto a bus or connection 112. After receipt of CES data stream, ingress element 120 (CES→PSN IWF) forwards or routes received data stream(s) to its destination via a CES circuit 150 through PSN 102. Egress element 122, on the other hand, receives CES data stream or packets via a CES circuit 152 through PSN 102. Egress element 122, in one embodiment, includes a clock domain management capable of characterizing and/or recovering reference clock from a data stream received. The data stream is subsequently forwarded by egress element 122 to its destination using recovered clock frequency 146 via connection 118. It should be noted that node 104 may include additional ingress and/or egress element(s).

Similarly, node 106 is a network device capable of receiving data from a circuit 150 (or CES) and routing data onto a circuit 152. As node 104, node 106 can be a router, a switch, a bridge, or a combination of router, switch, and/or bridge. Node 106 includes a timing analyzer 162, an egress element 132 and an ingress element 130 wherein elements 130-132 are coupled to network 158 and PSN 102. Ingress element 130 receives CES data stream or data frames having a reference clock 142 via connection 114. Reference clock 142 provides a clock frequency used to clock data onto a bus or connection 114. After receipt of CES data stream, ingress element 130 performs CES→PSN IWF and forwards the data stream to its destination via CES circuit 152 across PSN 102. Egress element 132, on the other hand, receives the CES data stream via CES circuit 150 across PSN 102. Egress element 132, in one embodiment, includes a clock domain management capable of characterizing and/or recovering reference clock from the received data stream. The data stream is forwarded by egress element 132 to its destination using recovered clock frequency 144 over connection 116. It should be noted that node 106 can include additional ingress and/or egress element(s).

Egress element 122 or 132 includes PSN and CES interworking function including adaptive clock recovery feature(s). The PSN and CES interworking function, in one embodiment, includes a clock domain management capable of selecting or recovering a clock frequency used to clock data stream onto a bus or connection 118. The clock domain management uses usage rate of a traffic buffer such as a jitter buffer to recover the reference clock. Ingress element 120 or 130, on the other hand, includes CES and PSN interworking function(s) capable of receiving data frames over bus 112 or 114 clocked by reference clock frequency 140 or 142, respectively.

Timing analyzer 160 or 162 is used to analyze timing characteristics of data packet(s) traveling through a PSN. Timing analyzer 160, for example, is able to inform user or carrier that certain circuits have failed or is about to fail because of timing offsets or timing wander over a period of time. An advantage of using timing analyzer 160 or 162 is that it allows a user or vendor to correct potential timing related problem(s) in accordance with timing offsets before the network fails.

Figure 2:
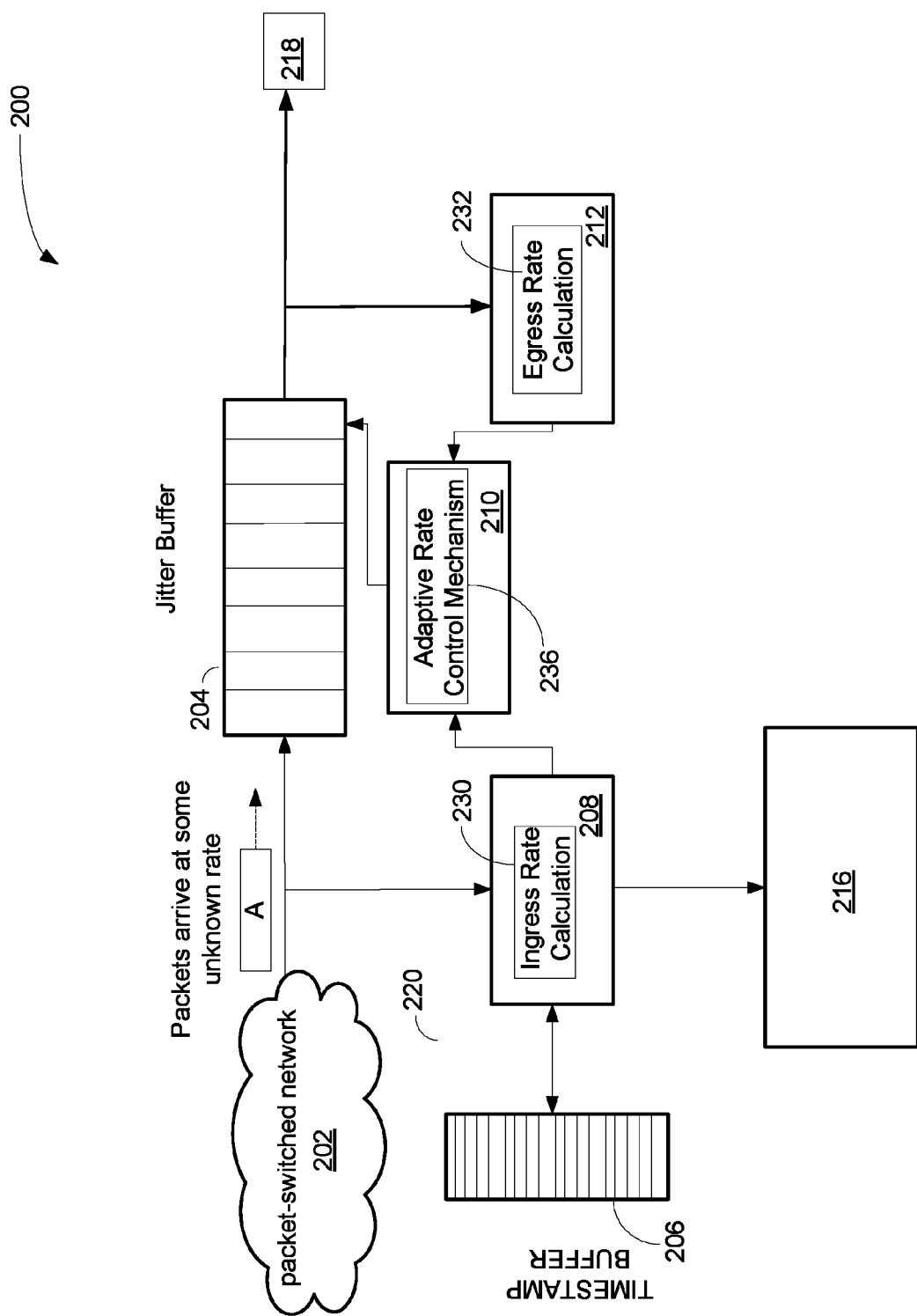
FIG. 2 is a block diagram illustrating a network device having an ingress element, egress element, and timing analyzer in accordance with one embodiment of the present invention.

FIG. 2 is a block diagram 200 illustrating a network device having an ingress element, egress element, and timing analyzer in accordance with one embodiment of the present invention. Diagram 200 includes PSN 202, jitter buffer 204, timestamp buffer 206, ingress element 208, controller 210, egress element 212, timing analyzer 220, and offset component 216. Block 218, in one example, indicates output of TDM streams or packets timed at an output rate or egress rate. Ingress element 208, in one embodiment, includes at least a portion of timing analyzer 220. It should be noted that the underlying concept of the exemplary embodiment(s) of the present invention would not change if one or more blocks (or elements or connections) were added to or removed from diagram 200.

Timing analyzer 220, which can be a hardware, software, firmware, or combination of hardware, software, and firmware components, includes timestamp buffer 206, portion of ingress element 208, and portion of offset component 216. Timestamp buffer 206 is a storage buffer able to store timestamps relating to packets arrival times. For example, if timestamp buffer 206 has 16,384 entries of storage space for storing 16,384 timestamps, timestamp buffer 206 is capable of holding 16,384 timestamps wherein the oldest timestamp is the arrival time of a packet that is received 16,384 packets ago. Timestamp buffer 206, in one embodiment, is a FIFO shift register or a circular buffer capable of storing a predefined number of timestamps (i.e., 16,384 of timestamps) which are used to determine deviation of packet arrival rate from PSN 202. It should be noted that the 16,384 entries in timestamp buffer 206 is an arbitrary number, and it can be adjusted based on the applications.

Deviation of packet arrival rate, in one aspect, is represented by offsets. The offsets are calculated by stored timestamps versus current timestamps. Depending on the applications, deviation can indicate potential problems or timing related errors within the network. Note that a portion of timestamps or offsets may be used to determine rate change or time adjustment over a period of time when packets are reconstructed into TDM data for transmission.

Jitter buffer 204, which is a temporary storage device or shift register, is able to accumulate a predetermined number of packets or SAToP packets. The stored packets are queued in jitter buffer 204 according to sequence numbers of the queued packets before they are being routed. The predetermined number of SAToP packets that can be stored in jitter buffer 204 is selected in such a way that jitter buffer 204 will not be empty due to certain predefined network conditions. For example, a predefined network condition may be selected in response to reducing certain network impairments such as jitter and/or wander. It should be noted that CES includes a number of variants, such as SAToP and CESoPSN.

Ingress rate calculation block 230 of ingress element 208, in one embodiment, includes a monitor component, stamp generator, offset calculator, and timing comparator. While the monitor component monitors incoming packets or SAToP packets from PSN 202, the stamp generator generates a timestamp each time a packet or SAToP packet arrives from PSN 202. After logging a newly generated timestamp in one of 16,384 entries of timestamp buffer 206, the offset calculator calculates time difference between the arrival time of the most recent packet and the arrival time of the oldest packet indicated by timestamp buffer 206. In one example, the offset calculator is able to generate an offset based on PPM by comparing between the most recent arrival time of a packet and the arrival time of a packet arrived 16,348 packets ago. The timing comparator provides a deviation or divergence value from the result of comparison between the offset and an ideal time range (or a range of acceptable limits).

Note that the ideal time for a TDM frequency can be 1,544,000 bits per second over a T1 carrier. Alternatively, the ideal time for a TDM frequency can be 2,048,000 bits per second over an E1 carrier. A range of acceptable limits, in one embodiment, can be plus (+) or minus (−) 25 PPM. For instance, if the deviation value is less than +/−25 PPM, the current timing is basically acceptable and timing adjustments are not needed. If the deviation value, however, is greater than +/−25 PPM, the current timing may need to be adjusted depending on the applications. Note that the range of +/−25 PPM is an exemplary range, and the range can change based on the applications.

In one embodiment, timing analyzer 220 is configured to facilitate timing reconstruction of a TDM stream based on the arrival rate of packets. Egress rate calculation block 232, which can be part of egress element 212, is able to clock outbound SAToP packet as it is sent for reconstruction into TDM data. Block 232 is also capable of calculating time difference between the most recently generated timestamp and a timestamp stored in midway in the circular buffer (i.e., 8,174 packets ago).

Adaptive rate control mechanism 236 takes rate calculations from block 232 and block 230 to generate an outbound rate for sending TDM data stream. It should be noted that adjusting egress rate should occur slowly over time as oppose to the changing rate of ingress rate which can occur more rapidly. Slow changing over egress rate, in one example, prevents transient conditions on PSN 202 from being reflected in the egress data clock rate.

Offset component 216, in one embodiment, is an offset processing module which is configured to activate a set of predefined actions based on the result of comparison between the offset and the range of acceptable limits. For example, offset component 216 may raise an alarm if the offset falls outside of the range of acceptable limits. Also, a log of lock rate may be entered in a local memory or record when the offset fall within the range of limits. Moreover, offset component 216 may send a warning message to a service provider or customer indicating certain device(s) may be incorrectly configured, congested, overloading, or the like. Also, offset component 216 can be configured to assist adaptive rate control mechanism 236 to adjust egress clock rate for outgoing TDM streams.

During an operation, upon receipt of a packet A or SAToP packet A from PSN 202, ingress rate calculation block 230 generates a timestamp A which is associated with arrival time of the packet A. As the packet A reaches to jitter buffer 204 for queuing, block 230 retrieves the oldest timestamp stored in timestamp buffer 206 and compares the oldest timestamp with timestamp A. Note that if timestamp buffer 206 has 16,384 entries and it is full, the oldest timestamp indicates the arrival time associated with a packet that is 16,384 packets ago. An offset is calculated based on the oldest timestamp and timestamp A. Based on the result of offset in view of a predefined range of limits, offset component 216 takes a set of predefined actions which will reduce overall device or system failure(s).

An advantage of using timing analyzer 220 in a router is that it is able to facilitate timing reconstruction of TDM stream based on the arrival rate of packets across PSN 202. For instance, a router takes a packet or packets as they arrive and store them in jitter buffer 204. After recording timestamps associated with packets as they arrive, the router measures the stored timestamps over time and calculates offsets based on arrival times of packets. For example, a PSN may transmit one (1) packet per one (1) millisecond ("ms") or packets arrive one (1) ms apart. If, for instance, packets arrive a little faster from PSN side, the TDM stream should also leave a little faster on the TDM side. Similarly, if packets arrive a little slower, the outbound TDM steam should also be gated a little slower. Although the operating frequency at source node across PSN is unknown, the router reconstructs the egress rate on the TDM side in accordance with the speed of arriving packets on the PSN side.

Timing analyzer 220, in one embodiment, provides non-invasive diagnostic information to identify issue(s) or potential failure(s) quickly without the use of third-party test equipments and/or intrusive diagnosis methods. For example, a router, able to provide SAToP data stream via PSN 202, employs various hardware such as chips and/or chipsets capable of running CES or SAToP protocol. The router using a set of timing tables and timing algorithm is able to reconstruct timing of the T1 or E1 signal traveling over its pathways. For example, the microcode and its supervisory code can calculate the timing for T1 or E1 circuit. An application code of router compares the offset to a set of user-definable criteria and raises an alarm when any of the circuits fall outside of the desirable range limits. It should be noted that a report or status relating to recorded offsets can be generated on-demand.

Another advantage of employing timing analyzer 220 is that it provides an automated way to analyze timing characteristics of T1 or E1 circuits traveling over SAToP or CESoPSN. In yet another benefit of using timing analyzer is that it removes the need for external equipment to analyze the timing.

Figure 3:
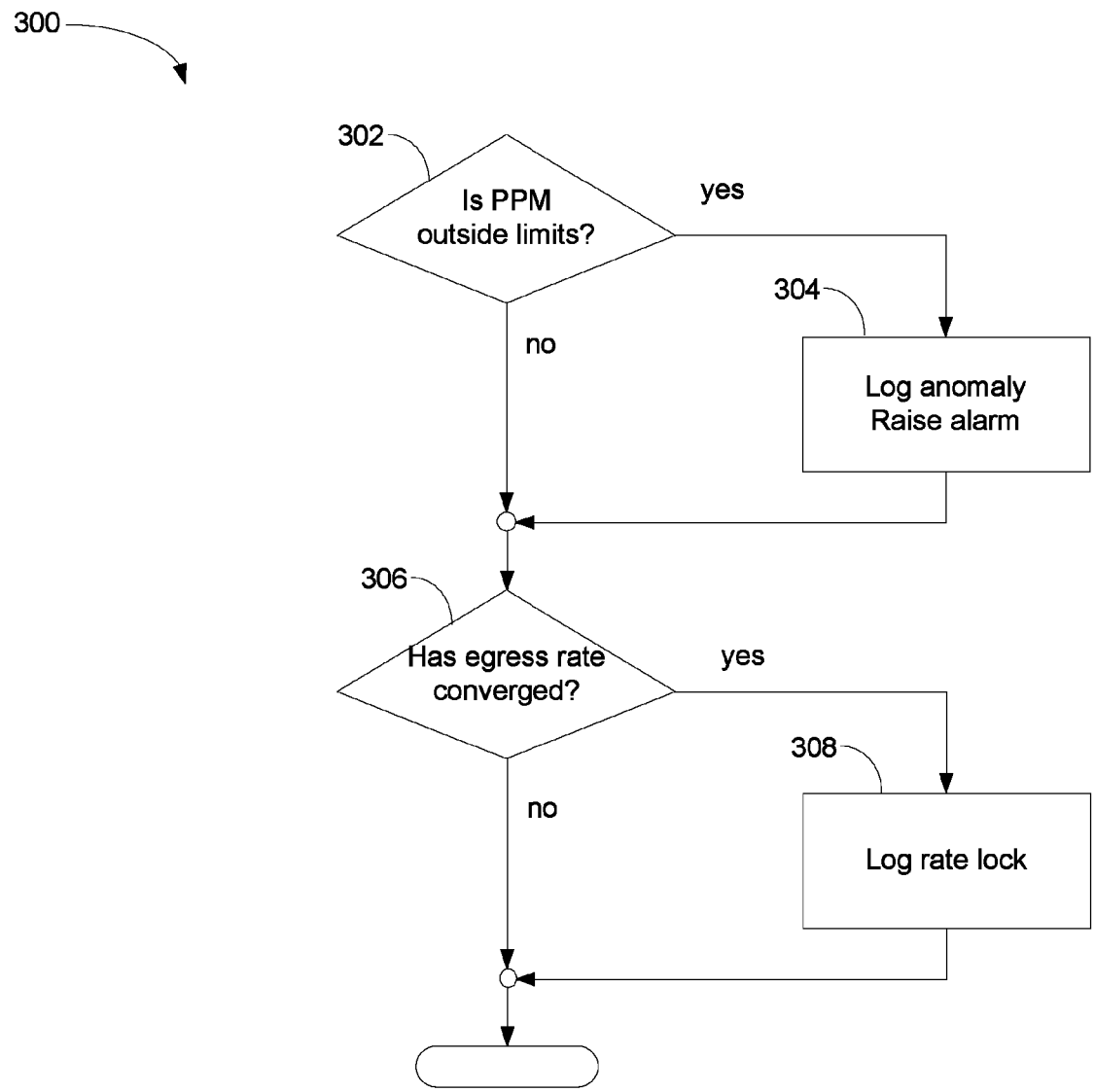
FIG. 3 is a flowchart illustrating a process able to identify timing offsets in accordance with one embodiment of the present invention.

FIG. 3 is a flowchart 300 illustrating a process able to identify timing offsets in accordance with one embodiment of the present invention. Flowchart 300 illustrates thresholds that can be checked instantaneously and do not require stored PPM data. At block 302, the process checks to see if the ingress PPM is outside some predefined range. If the ingress PPM is within the predefined range or limits, the process indicates that the ingress rate is similar to the expected T1 or E1 nominal rate. For example, the ingress PPM is not to exceed +/−5 PPM of T1 nominal rate or predefined limits. If, however, the ingress PPM exceeds the predefined range of limits (or some other predefined customer value), the process proceeds to block 304. At block 304, the process logs an anomaly status in a log or record, and raises an alarm to warn administrator(s) about potential error or failure.

At block 306, the process examines whether the egress rate has converged in view of ingress rate. Note that under the normal operation, the egress rate should converge to meet the ingress rate at a predefined time period. If the egress rate has converged, the process proceeds to block 308. For instance, the egress rate has converged if egress rate is within 1 to 5 PPM of ingress rate. At block 308, the process notes the convergence in a log to indicate a rate lock. Otherwise, the process logs the instances where the rate did not converge in a timely manner. Alternatively, the process may also record duration for rate to reach the rate lock.

During initial establishment of a SAToP connection, various data structures and state machines are initialized to determine an egress rate or outbound speed for packets to be sent. Upon rate calculation based on packets collected over a period of time, an ingress rate can be quickly determined according to the rate at which packets arrive from the PSN side. The egress rate, however, is generally adjusted slowly over time to match the ingress rate. In other words, once the system is stable and if network conditions remain stable, neither egress rate nor ingress rate should fluctuate widely over time until device and/or circuit(s) failure occurs.

Figure 4:
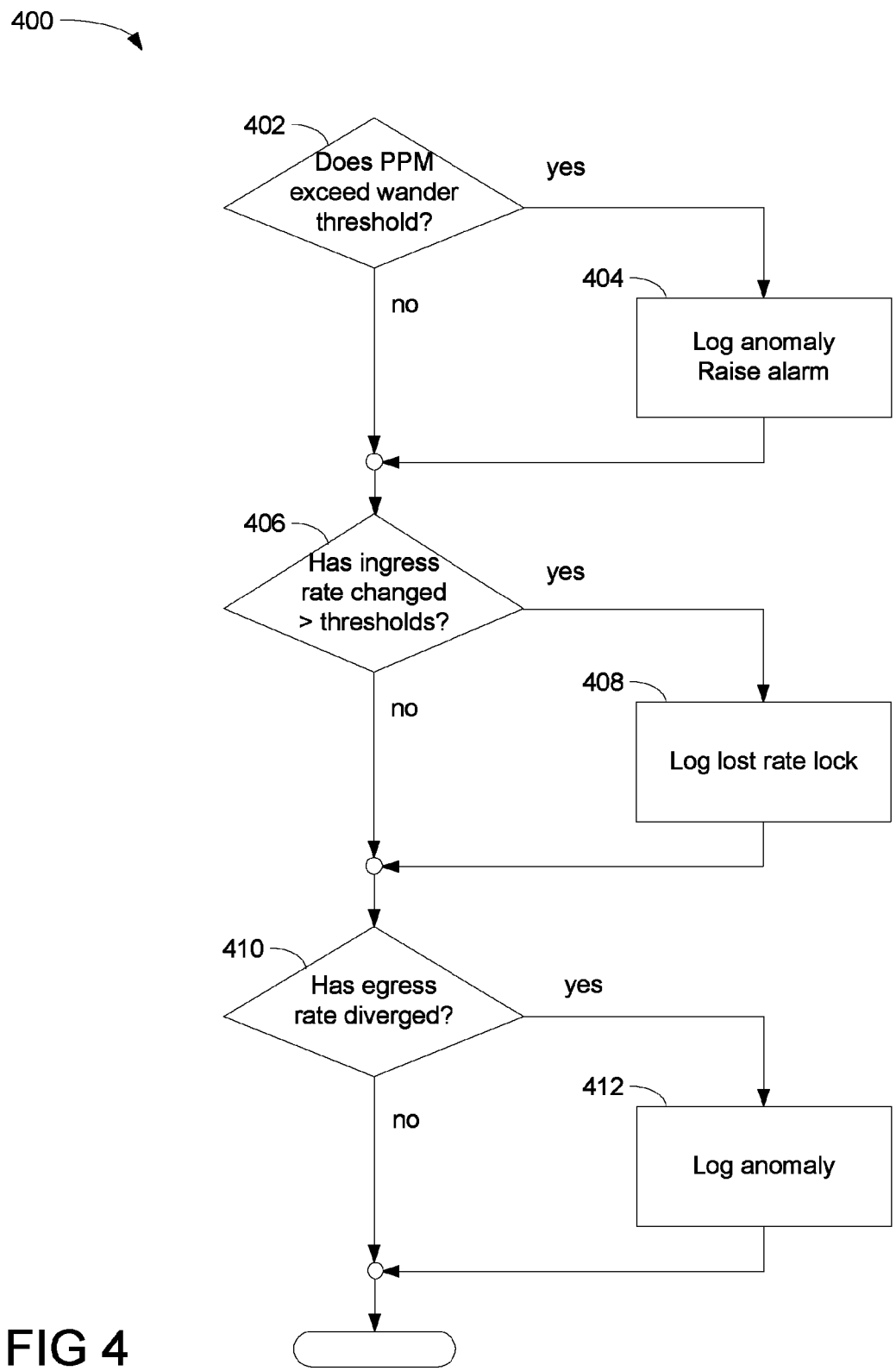
FIG. 4 is a flowchart illustrating a process capable of identifying timing wandering over a period of time in accordance with one embodiment of the present invention.

FIG. 4 is a flowchart 400 illustrating a process capable of identifying timing wandering over a period of time in accordance with one embodiment of the present invention. Flowchart 400 is based on thresholds that cannot be checked until measurements are collected and offsets are calculated. At block 402, the process checks to see where the wander which is indicated by PPM exceeds a predefined wander threshold. Note that the wander threshold is for the T1 or E1 signal. If the offset which may be indicated by PPM does not exceed the wander threshold, the process proceeds to the next block. Otherwise, the process proceeds to block 404. At block 404, after analyzing a portion or window of a series of packets collected, a peak-to-peak range of PPM is measured. If the measurement is greater than expected limits such as +5 PPM, an anomaly is logged and an alarm is subsequently raised.

At block 406, the process checks to see whether the change of ingress rate is greater than the thresholds. If the change is greater than the thresholds, the process, at block 408, predicts that according to recent arrival rate jump, a device change or failure may have occurred. The process notes the change in ingress rate and records lost rate lock in a log when a rate change or jump is detected.

At block 410, the process exams to see whether egress rate has diverged over time. If the divergence is true which means that the egress rate has changed unexpectedly regardless of the ingress rate, the process proceeds to block 412. It should be noted that if the PPM calculated exceeds the threshold, an alarm, for example, is raised. At block 412, the process may predict certain internal error(s) or potential failure(s) in the router itself. The anomaly is subsequently noted in the log. It should be noted that if PPMs are off too much, an alarm is set off. Note that PPM of offset falls outside of threshold may indicate device failing, inaccurate device configuration, bad circuit connection, congestion, damages, loading, and the like.

Figure 5:
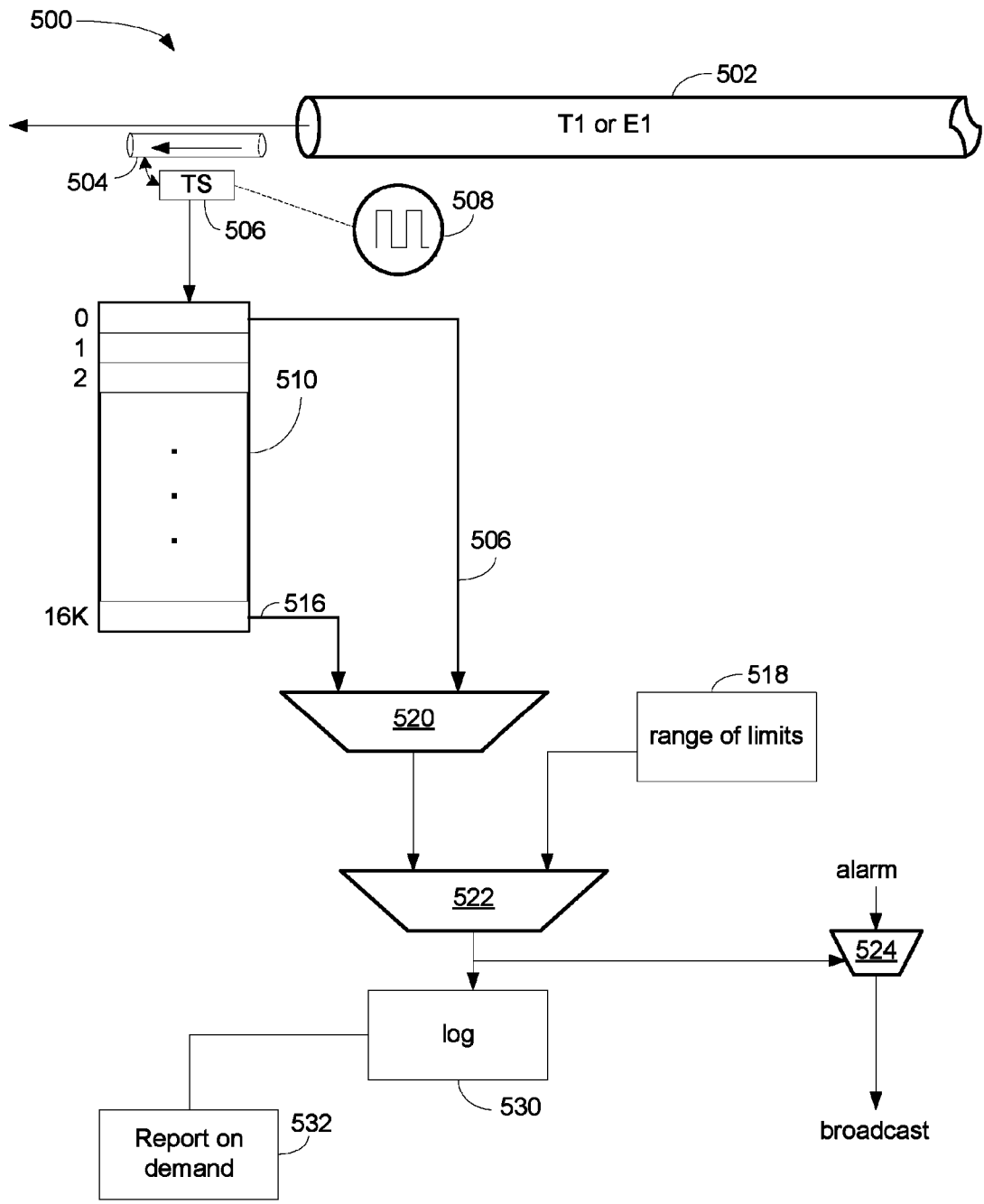
FIG. 5 is a logic block diagram illustrating timing analyzer using a timestamp buffer in accordance with one embodiment of the present invention.

FIG. 5 is a logic block diagram 500 illustrating timing analyzer using a timestamp buffer 510 within a router in accordance with one embodiment of the present invention. Diagram 500 includes a T1 (or E1) circuit 502, packet 504, timestamp 506, clock 508, timestamp buffer 510, and a range of limits 518. Note the T1 circuit 502 can be a CES or SAToP capable of transmitting data. It should be noted that the underlying concept of the exemplary embodiment(s) of the present invention would not change if one or more blocks (or elements or connections) were added to or removed from diagram 500.

When the router or network device receives packet 504 transmitted across T1 carrier 502 from a PSN, the timing analyzer stamps or generates a timestamp 506 in accordance with a local clock 508. After storing timestamp 506 at the top of timestamp buffer 510, the timing analyzer retrieves oldest timestamp 516 from the bottom of the stack or buffer 510. Oldest timestamp 516 is the oldest timestamp in timestamp buffer 510 such as the timestamp for a packet that is 16,384 packets ago. Block 520 compares timestamps 506 and 516 and generates an offset based on the result of the comparison. The offset, in one embodiment, is represented by PPM. Block 522 compares the offset with a range of limits 518 which is a set of predefined limitations. The result of the comparison is stored in a log 530. If the result indicates that the offset falls outside of the range of limits 518, an alarm is raised and broadcasted via gate logic 524. Block 532, coupled to log 530, is capable of generating a report on-demand based on the information in log 530.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 6:
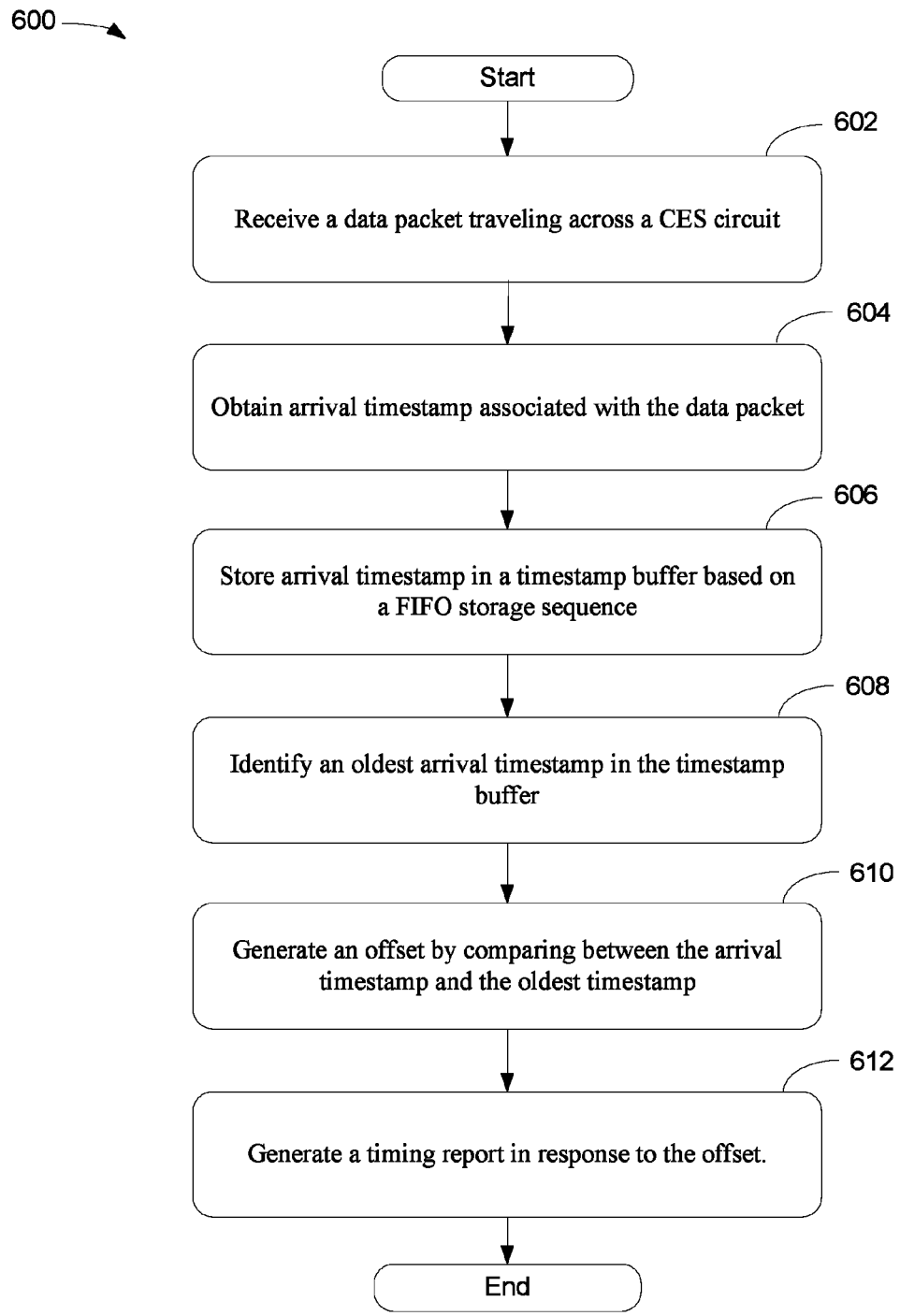
FIG. 6 is a flowchart illustrating a process of timing analyzer using a timestamp buffer in accordance with one embodiment of the present invention.

FIG. 6 is a flowchart 600 illustrating a process of timing analyzer using a timestamp buffer in accordance with one embodiment of the present invention. At block 602, a process capable of generating timing offsets associated with a network circuit receives a first data packet traveling across a first CES circuit. For example, the first data packet is received from a T1 carrier which is configured to support SAToP or CESoPSN circuit. Alternatively, the first data packet travels across an E1 carrier via a first CES circuit.

At block 604, a first arrival timestamp or first timestamp associated with the first data packet is obtained. For example, a timestamp is generated at the time when the first data packet is received at the port of the network device. Alternatively, the process is able to extract an embedded timestamp from the first data packet if the packet contains its own timestamp.

At block 606, the first arrival timestamp is stored in a first timestamp buffer based on a FIFO storage sequence. In one embodiment, the first arrival timestamp is stored in a circular buffer containing a predefined number of entries for storing timestamps. For example, the process is able to identify one of 16,384 storage entries as the next storage entry for storing the first arrival timestamp. The FIFO storage sequence allows a packet arrival time to be temporary saved in the buffer for time duration of the next 16,384 packets. When the 16,385 packet is received, the oldest timestamp is discarded or shifted out of queue to make room for the new arrival. Note that the total storage capacity of a timestamp buffer can change based on the applications.

At block 608, the oldest arrival timestamp in the first timestamp buffer is identified. In other words, the process is able to retrieve the earliest stored content from the first timestamp buffer. In one aspect, the first timestamp buffer is a shift register, and the earliest stored content in the first timestamp buffer will be shifted out as soon as the new timestamp arrives.

At block 610, a first offset is generated by comparing between the first arrival timestamp and the oldest timestamp. In one example, the process generates PPM data to represent the first offset based on the result of comparison between the first arrival timestamp and the oldest timestamp. In one embodiment, the implementation of comparison or calculation will not start until the timestamp buffer is filled.

At block 612, upon demand by a user, an on-demand report is produced in response to the first offset. In addition, the process is capable of setting or raising an alert when the first offset is greater than a predefined PPM limits. Note that the predefined PPM can have a range between +25 PPM and −25 PPM. For example, a warning message is sent when the first offset falls outside of a predefined range. Alternatively, rate lock status is recorded in a log when the first offset falls within a predefined range. The process is further capable of receiving a second data packet traveling across a first CES circuit. Upon obtaining a second arrival timestamp associated with the second data packet, the second arrival timestamp is stored in the first timestamp buffer based on a FIFO storage sequence. In one embodiment, the process is capable of receiving a third data packet traveling across a second CES circuit. Upon obtaining a third arrival timestamp associated with the third data packet, the third arrival timestamp is stored in a second timestamp buffer based on a FIFO storage sequence. After identifying an oldest arrival timestamp in the second timestamp buffer in accordance with the FIFO storage sequence, a third offset is generated by comparing between the third arrival timestamp and the oldest arrival timestamp of the second timestamp buffer. A second timing report can also be generated in response to the third offset.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A network system to adjust timing for packet transmission, comprising:
    an ingress component coupled to a first circuit emulation service ("CES") circuit and configured to generate a first timestamp indicating arrival time of a first data packet traveling across the first CES circuit;
    a timing analyzer coupled to the ingress component and configured to calculate a timing offset in accordance with the first timestamp, wherein the timing analyzer includes a timestamp buffer configured to store a plurality of arrival timestamps based on a first-in first-out ("FIFO") storage sequence, a rate calculator coupled to the timestamp buffer and configured to compare an oldest timestamp in the timestamp buffer with a newly arrived timestamp to identify an offset, and a log coupled to an ingress rate manager and configured to record rate lock status when the first offset falls within a predefined range; and
    an egress element coupled to the timing analyzer and configured to adjust egress clock rate for outgoing packet streams in response to the timing offset.

2. The system of claim 1, wherein the ingress component includes an ingress rate manager configured to generate a timing report in response to the offset.

3. The system of claim 2, wherein the ingress component is coupled to a second CES circuit and configured to generate a second timestamp indicating arrival time of a second data packet traveling across the second CES circuit.

4. The system of claim 3, further comprising a second timestamp buffer coupled to the ingress component and configured to store the second timestamp based on a circular storage sequence.

5. The system of claim 1, further comprising a jitter buffer coupled to the ingress component and configured to queue a plurality of packets according to sequence numbers of packets before the packets are being routed.

6. The system of claim 1, further comprising a block of adaptive rate control mechanism coupled to the ingress component and configured to generate an outbound rate for sending data streams.

7. The system of claim 1, wherein the timing analyzer is configured to generate a warning signal if the timing offset is greater than a range of predefined limits.

8. A network device, configured to generate timing offsets associated with a network transmission, comprising:
    an egress element configured to send data streams based on an adjusted egress rate;
    a jitter buffer coupled to the egress element and configured to temporarily store packets; and
    an ingress component coupled to the jitter buffer and coupled to a circuit emulation service ("CES") circuit for receiving data packets, wherein the ingress component includes,
        a monitor component configured to monitor incoming packets from a packet switching network ("PSN");
        a stamp generator coupled to the monitor component and configured to generate a timestamp each time a packet arrives;
        an offset calculator coupled to the stamp generator and configured to calculate time difference between the arrival time of the most recent packet and arrival time of oldest packet stored in a timestamp buffer, wherein the offset calculator includes a timestamp buffer for storing arrival timestamps based on a first-in first-out ("FIFO") storage sequence, a rate calculator for comparing an oldest timestamp in the timestamp buffer with a newly arrived timestamp to identify an offset, and a log coupled to an ingress rate manager and configured to record rate lock status when the offset falls within a predefined range.

9. The network device of claim 8, wherein the ingress component further includes a timing comparator coupled to the offset calculator and configured to provide a deviation or divergence value.

10. The network device of claim 9, wherein the timing comparator compares the offset against a range of acceptable limits.

11. A network device, configured to generate timing offsets associated with a network transmission, comprising:
    an egress element configured to send data streams based on an adjusted egress rate;
    a jitter buffer coupled to the egress element and configured to temporarily store packets; and
    an ingress component coupled to the jitter buffer and coupled to a circuit emulation service ("CES") circuit for receiving data packets, wherein the ingress component includes,
        a monitor component configured to monitor incoming packets from a packet switching network ("PSN");
        a stamp generator coupled to the monitor component and configured to generate a timestamp each time a packet arrives;
        a timing analyzer coupled to the ingress component and configured to calculate a timing offset in accordance with the first timestamp, wherein the offset calculator includes a timestamp buffer for storing arrival timestamps based on a first-in first-out ("FIFO") storage sequence, a rate calculator for comparing an oldest timestamp in the timestamp buffer with a newly arrived timestamp to identify an offset, and a log coupled to an ingress rate manager and configured to record rate lock status when the offset falls within a predefined range.

12. The network device of claim 11, further comprising an offset calculator coupled to the stamp generator and configured to calculate time difference between the arrival time of the most recent packet and arrival time of oldest packet stored in a timestamp buffer.

13. The network device of claim 11, wherein the ingress component further includes a timing comparator coupled to the offset calculator and configured to provide a deviation or divergence value.

14. The network device of claim 13, wherein the timing comparator compares the offset against a range of acceptable limits.

* * * * *